(12) United States Patent
Chavda et al.

(10) Patent No.: US 8,495,018 B2
(45) Date of Patent: Jul. 23, 2013

(54) TRANSITIONING APPLICATION REPLICATION CONFIGURATIONS IN A NETWORKED COMPUTING ENVIRONMENT

(75) Inventors: Kavita Chavda, Roswell, GA (US); Nagapramod S. Mandagere, San Jose, CA (US); Sandeep M. Uttamchandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/168,066

(22) Filed: Jun. 24, 2011

(65) Prior Publication Data

US 2012/0330895 A1 Dec. 27, 2012

(51) Int. Cl.
*G06F 17/00* (2006.01)
*G06F 17/30* (2006.01)

(52) U.S. Cl.
CPC ............................. *G06F 17/30017* (2013.01)
USPC .......................................... 707/634; 707/812

(58) Field of Classification Search
USPC ................ 707/633, 634, 635, 803, 804, 812, 707/791, 797
See application file for complete search history.

(56) References Cited

U.S. PATENT DOCUMENTS

| | | | |
|---|---|---|---|
| 6,732,294 B2 | 5/2004 | Mackrory et al. | |
| 7,149,919 B2 | 12/2006 | Cochran et al. | |
| 7,634,685 B2 | 12/2009 | Henrickson | |
| 7,861,111 B2 | 12/2010 | Doerr | |
| 2006/0101048 A1* | 5/2006 | Mazzagatti et al. | 707/101 |
| 2008/0154970 A1* | 6/2008 | DeBie | 707/200 |
| 2009/0055689 A1 | 2/2009 | Petersen | |
| 2011/0022879 A1 | 1/2011 | Chavda et al. | |

OTHER PUBLICATIONS

Chao et al., Mime: a high performance parallel storage device with strong recovery guarantees, Google, 1992, 20 pages.*
Maitland, J., "Keeping Control Isn't Easy", Chapter 4: Cloud-Based Infrastructure, SearchCloudComputing.com, 13 pages, Jun. 24, 2011.
Mell et al., "The NIST Definition of Cloud Computing", National Institute of Standards and Technology, Information Technology Laboratory, Version 15, Oct. 7, 2009, 2 pages.

(Continued)

*Primary Examiner* — Jean B Fleurantin
(74) *Attorney, Agent, or Firm* — William E. Schiesser; Maxine L. Barasch; Keohane & D'Alessandro PLLC (57) ABSTRACT

Embodiments of the present invention provide an approach for providing non-disruptive transitioning of application replication configurations and proactive analysis of possible error scenarios. Specifically, under embodiments of the present invention, a common integration model (CIM)-compatible representation of a system replication plan is provided in a computer data structure. Based on the representation, a hierarchical tree data structure having a set of nodes is created. A set of system configuration updates pertaining to the set of nodes are then classified (e.g., based upon the type of configuration update). Once the set of nodes has been classified, the set of nodes may then be analyzed to determine if any nodes of the set are isomorphic. If so, the plan can be modified accordingly. In any event, the replication plan (or modified replication plan) may then be implemented.

25 Claims, 7 Drawing Sheets

OTHER PUBLICATIONS

Chen, W. et al., "High Availability and Disaster Recovery Options for DB2M, Linux, UNIX, and Windows", Information Management Software, IBM.com/redbooks, 878 pages, Jun. 24, 2011.

"Introduction to Oracle Data Guard", Oracle Data Guard Concepts and Administration, 10g Release 2 (10.2), Part No. B14239-05. http://download.oracle.com/cd/B19306_01/server.102/014239/concepts.htm, 7 pages, Jun. 24, 2011.

Ji, M. et al., "Seneca: remote mirroring done write", Proceedings of USENIX Technical Conference (San Antonio, TX), USENIX, Berkeley, CA, Jun. 2003, pp. 253-268.

Riverbed expands its whitewater line of cloud storage acccelerators, http://www.wwpi.com/index.php?option=com_content&view=article&id=11257:riverbed-. . . Apr. 6, 2011, 2 pages.

"IBM Data Mobility Services—Softek Replicator," IBM.Com/services/storage, 4 pages, Jun. 24, 2011.

Verna, A., et al., SWEEPER: an Efficient Disaster Recovery Point Identification Mechanism, FAST'08: 6thy USENIX Conference on File and Storage Technologies, 16 pages, Jun. 24, 2011.

Virtual Machine Backup Guide, ESX Server 3.0.1 and VirtualCenter 20.1 Vmware, Inc., Palo Alto, CA, 74 pages. www.VMware.com, 74 pages, Jun. 24, 2011.

* cited by examiner

TRANSITIONING APPLICATION REPLICATION CONFIGURATIONS IN A NETWORKED COMPUTING ENVIRONMENT

TECHNICAL FIELD

In general, embodiments of the present invention relate to disaster recovery (DR). Specifically, embodiments of the present invention relate to non-disruptive transitioning of application replication configurations and error analysis in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges can exist when attempting to transition a computing environment from one configuration to another. Specifically, an impact of a new configuration on a production computing system can be unknown and difficult to ascertain. Moreover, a revision of a system configuration can cause backup recovery points taken over a given period of time to become obsolete, since a restoration workflow can be difficult to define in the context of a superseded recovery point.

SUMMARY

In general, embodiments of the present invention provide an approach for providing non-disruptive transitioning of application replication configurations and proactive analysis of possible error scenarios. Specifically, under embodiments of the present invention, a common integration model (CIM)-compatible representation of a system replication plan is provided in a computer data structure. Based on the representation, a hierarchical tree data structure having a set of nodes is created. A set of system configuration updates pertaining to the set of nodes are then classified (e.g., based upon the type of configuration update). Once the set of nodes has been classified, the set of nodes may then be analyzed to determine if any nodes of the set are isomorphic. If so, the plan can be modified accordingly. In any event, the replication plan (or modified replication plan) may then be implemented.

A first aspect of the present invention provides a computer-implemented method for transitioning replication configurations in a networked computing environment, comprising: providing a representation of a replication plan in a computer data structure; creating a hierarchical tree data structure having a set of nodes based on the representation; classifying a set of system configuration updates pertaining to the set of nodes; analyzing the set of nodes to determine if any of the set of nodes is isomorphic; and implementing the replication plan responsive to the analyzing.

A second aspect of the present invention provides a system for transitioning replication configurations in a networked computing environment, comprising: a bus; a processor coupled to the bus; and a memory medium coupled to the bus, the memory medium comprising instructions to: provide a representation of a replication plan in a computer data structure; create a hierarchical tree data structure having a set of nodes based on the representation; classify a set of system configuration updates pertaining to the set of nodes; analyze the set of nodes to determine if any of the set of nodes is isomorphic; and implement the replication plan responsive to the analyzing.

A third aspect of the present invention provides a computer program product for transitioning replication configurations in a networked computing environment, the computer program product comprising a computer readable storage media, and program instructions stored on the computer readable storage media, to: provide a representation of a replication plan in a computer data structure; create a hierarchical tree data structure having a set of nodes based on the representation; classify a set of system configuration updates pertaining to the set of nodes; analyze the set of nodes to determine if any of the set of nodes is isomorphic; and implement the replication plan responsive to the analyzing.

A fourth aspect of the present invention provides a method for transitioning replication configurations in a networked computing environment, comprising: providing a computer infrastructure being operable to: provide a representation of a replication plan in a computer data structure; create a hierarchical tree data structure having a set of nodes based on the representation; classify a set of system configuration updates pertaining to the set of nodes; analyze the set of nodes to determine if any of the set of nodes is isomorphic; and implement the replication plan responsive to the analyzing.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for providing non-disruptive transitioning of application replication configurations and proactive analysis of possible error scenarios. Specifically, under embodiments of the present invention, a common integration model (CIM)-compatible representation of a system replication plan is provided in a computer data structure. Based on the representation, a hierarchical tree data structure having a set of nodes is created. A set of system configuration updates pertaining to the set of nodes are then classified (e.g., based upon the type of configuration update). Once the set of nodes has been classified, the set of nodes may then be analyzed to determine if any nodes of the set are isomorphic. If so, the plan can be modified accordingly. In any event, the replication plan (or modified replication plan) may then be implemented.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Figure 1:
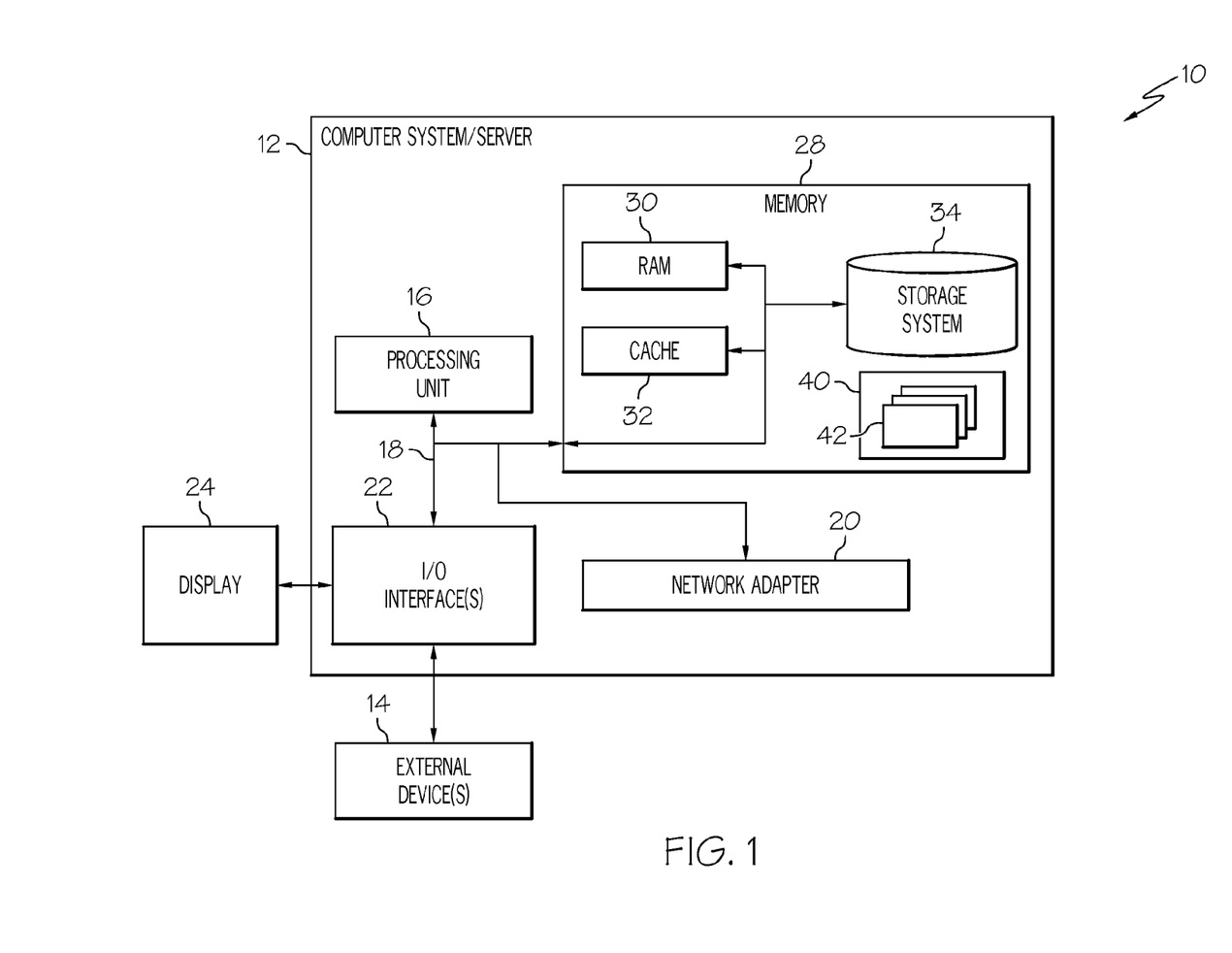
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
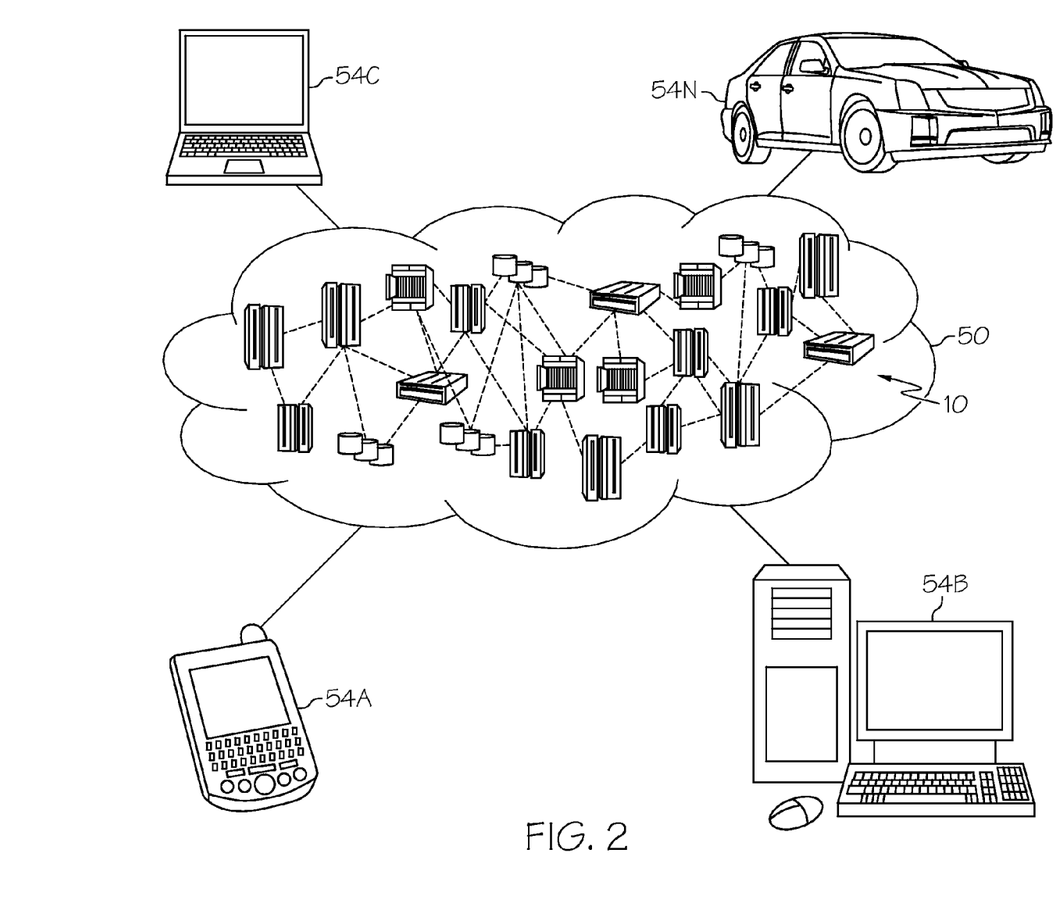
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
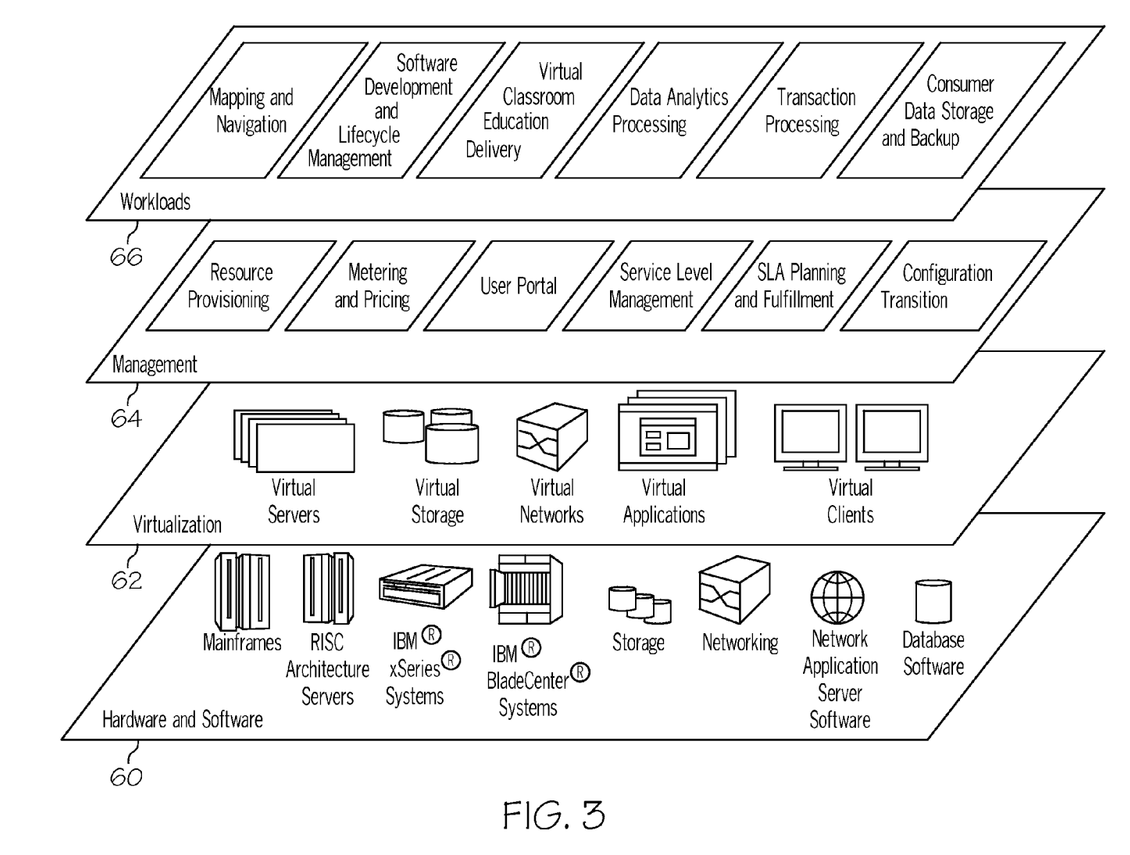
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is configuration transition, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the configuration transition functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
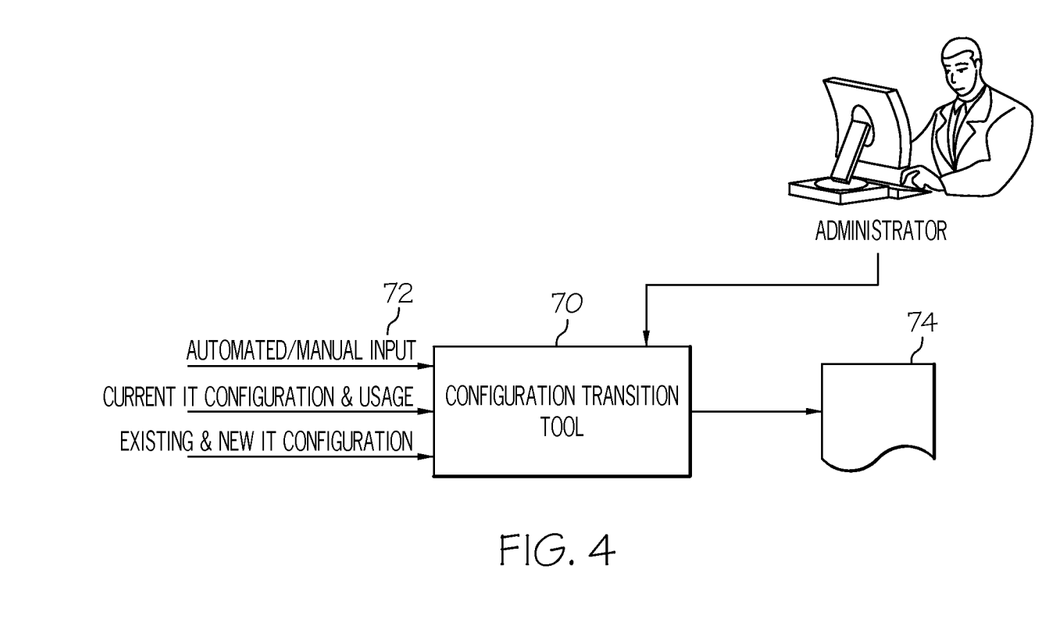
FIG. 4 depicts a system diagram according to an embodiment of the present invention.

Referring now to FIG. 4, a system diagram according to an embodiment of the present invention is shown. In general, the system diagram provides an approach that deploys updates to a replication configuration in an on-line fashion with minimal impact to the application performance as well as the deployed replication configuration. The approached shown within the framework of FIG. 4 allows administrators performing a proactive/what-if analysis to understand/evaluate the impact of a new configuration.

In general, the system comprises a configuration transition tool 70 that can be tangibly embodied by program 40 of FIG. 1 and carry out the steps of configuration transition function of management layer 64 of FIG. 3. In a typical embodiment, tool/framework 70 will receive input 72 of various formats such as current information technology (IT) configuration and usage, and existing and new IT configurations. This information will be used by tool 70 in conjunction with a set of rules or the like to generate a replication plan 74 for transitioning replication configurations.

In general, tool 70 will have the following features and/or perform the following functions:

The system described herein can be a feature of an existing resiliency management solution of a stand-alone module. The input to tool 70 will be plan information. In a typical embodiment, the plan will be represented in a common integration model (CIM)-based format.

Tool 70 will convert the plan into a hierarchical tree format. The steps involved includes one or more of the following:

Create a forest of trees; there is a tree for each application.

The root of each tree is an application (enterprise or proprietary).

For each root node, the child nodes are the storage volumes associated with the application.

For each volume node, the children represent the replication relationships. The child can be in serial or parallel relationship with the parent.

Relationships can be of different types (e.g., cloud service).

The tool 70 described herein can be invoked in at least two modes: 1) configuration transition; 2) proactive/what-if error analysis.

Classification Step: Configuration updates are classified to fall into the following configuration types:

New hardware resources

New replication licenses

Application configuration change

Migration of application resources

In this step, the type of change between the current and new resiliency configurations is classified. For each tree in the forest, tool 70 performs one or more of the following steps:

Analyze the first level nodes in the two trees

Check if any of the nodes is isomorphic

If not, the application configuration is modified

For each volume node in the tree (level 1), check if isomorphic

This checks if any of the relationships are modified. Tool 70 will then generate a differential list between the two plans.

Model analysis step: in this step, the plan modifications are analyzed for the bandwidth consumption changes and slowdown in application performance. The performance models are used to define:

Add/delete/change logical relationships

Add/delete/change physical relationships

Add/delete/change continuous replication operations

Transition orchestrator: This step analyzes the changes in the replication plan.

Figure 5:
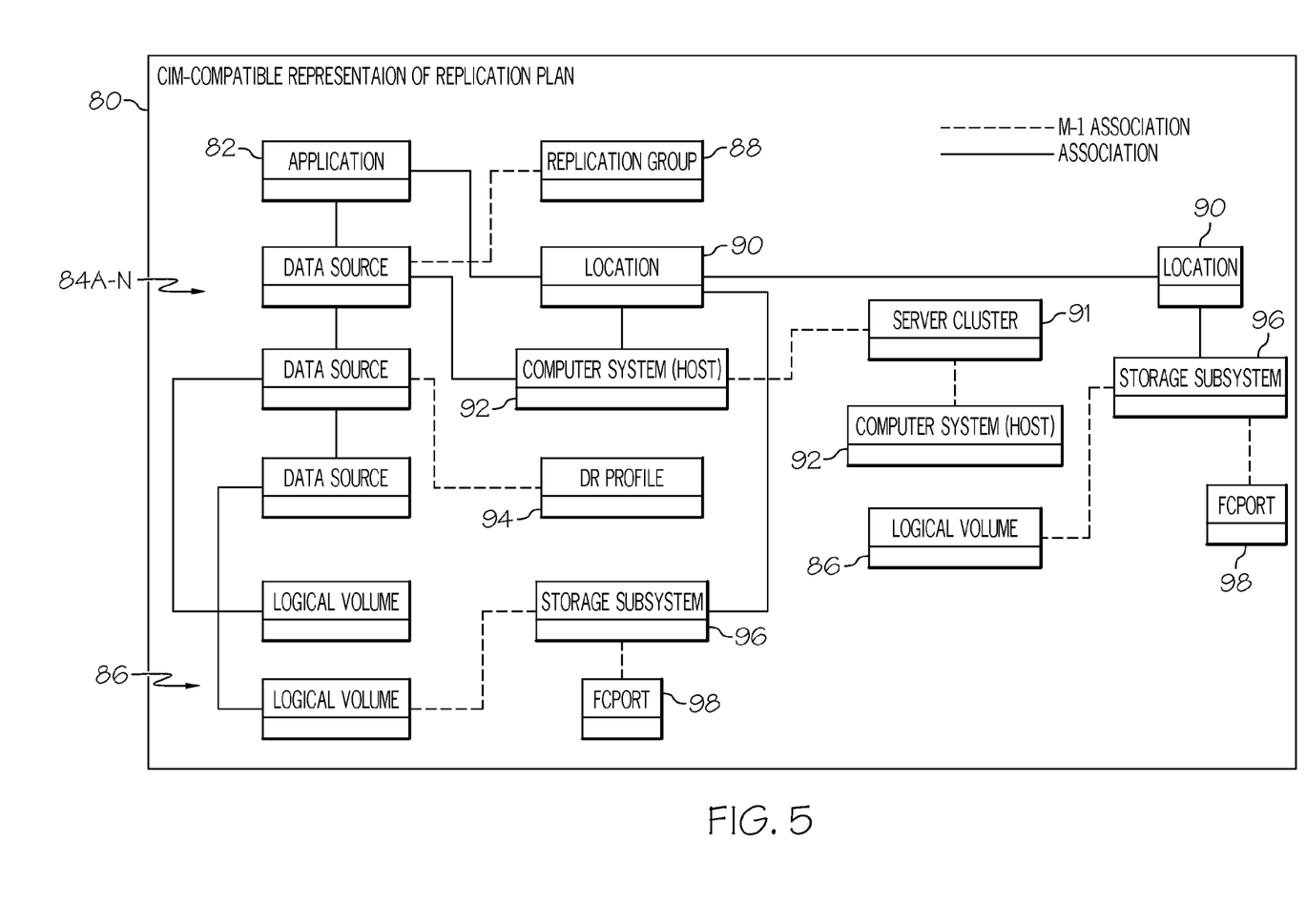
FIG. 5 depicts a replication plan according to an embodiment of the present invention.

For each volume node in the tree (level 1), check if isomorphic. This checks if any of the relationships are modified. At the end of this step, tool 70 will generate an additional differential list between the two plans Referring now to FIGS. 5-6, this process will be described in greater detail. First, a replication plan is provided in a CIM-based format. FIG. 5. shows such a replication plan 80. As depicted, plan 80 can have various elements such as application elements 82, data source elements 84A-N, logical volume elements 86, replication group elements 88, location elements 90, server cluster elements 91, computer system elements 92, Disaster Recovery (DR) profile element 94, storage subsystem elements 96, and Fiber Channel (FC) port elements 98. It is understood that plan 80 is intended only to be illustrative and that other replication plans can have different elements.

Figure 6:
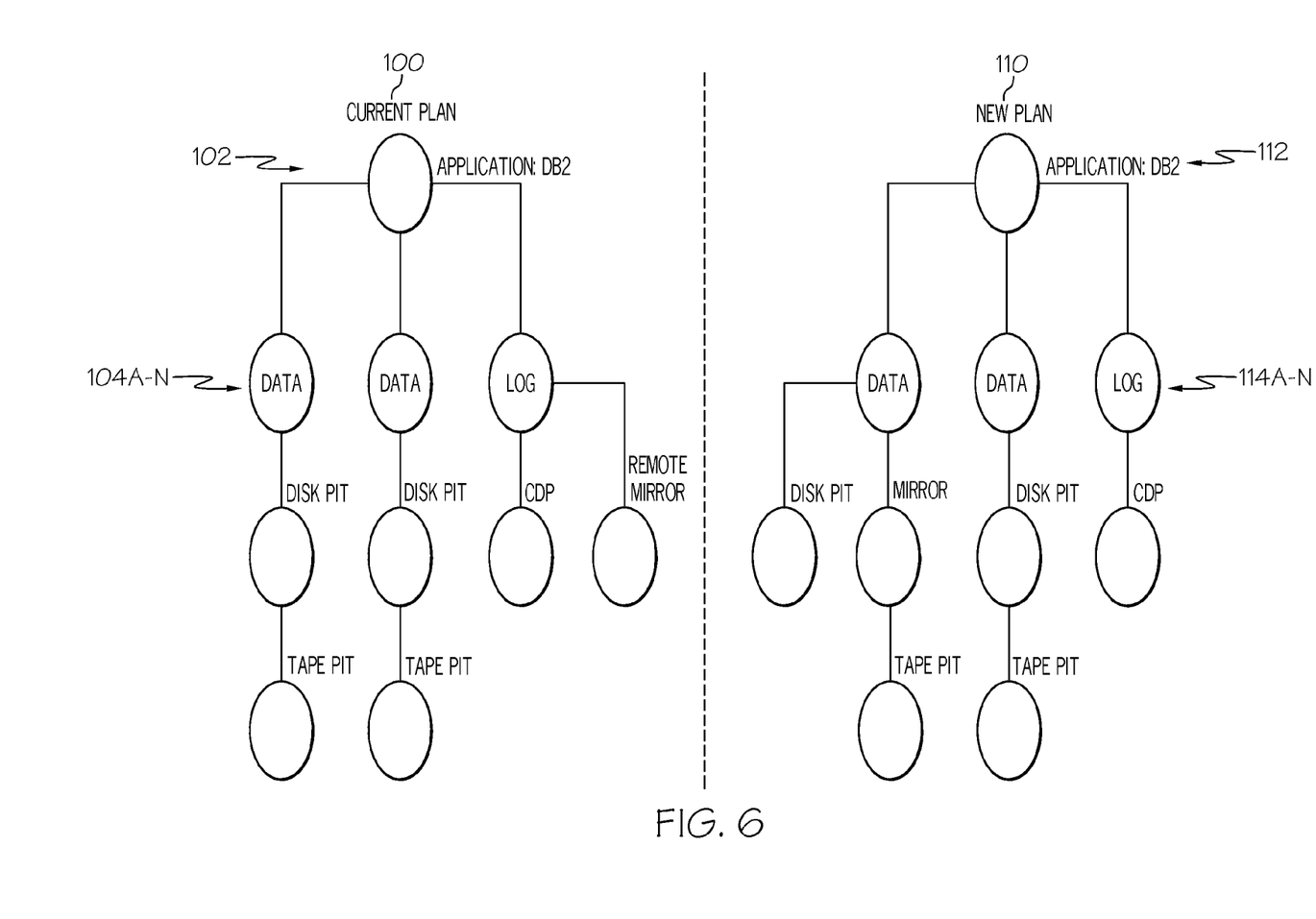
FIG. 6 depicts a hierarchical tree representation of a replication plan according to an embodiment of the present invention.

Regardless, tool 70 will convert replication plan 80 into a hierarchical tree format. An example is shown as tree 100 in FIG. 6. As depicted, tree 100 comprises a root node 102 and levels 104A-N of children nodes (PiT=Point in Time). The steps involved with hierarchical tree generation include one or more of the following:

Create a forest of trees so that there is a tree 100 for each application.

The root 102 of each tree 100 is an application (enterprise or home-grown).

For each root node 102, the child nodes are the storage volumes associated with the application.

For each volume node, the children represent the replication relationships. The child can be in serial or parallel relationship with the parent. Relationships can be of different types (e.g., cloud service).

Once tree 100 has been generated, any configuration updates associated with the nodes will be classified by type to fall into one or more of the following configuration types: new hardware resources; new replication licenses; application configuration change; and/or migration of application resources. In this step, tool 70 classifies the type of change between the current and new resiliency configurations. For each tree 100 in the forest, one or more of the following steps will be performed:

Analyze the first level nodes in the two trees—check if isomorphic.

If not, the application configuration is modified.

For each volume node in the tree (level 1), check if isomorphic. This checks if any of the relationships are modified.

If any of the nodes is isomorphic, modify the replication plan accordingly to yield a new tree 110 having root node 112 and child nodes 114A-N.

Implement the replication plan (e.g., either the plan corresponding to tree 100, or to tree 110).

Shown below is an illustrative routine according to an embodiment of the present invention (e.g., software pseudocode):

```
1: procedure is isomorphic_T 1 T 2
2:   assign level numbers to all nodes of T 1 and T 2
3:   assign to all leaves of T 1 and T 2 the integer 0
4:   let L 1 be a list of the leaves of T 1 at level 0
5:   let L 2 be a list of the leaves of T 2 at level 0
6:   for all levels i starting from 1 do
7:     assign integers to all nodes at level i
8:     if the roots of T 1 and T 2 are assigned the same integer then
9:       T 1 and T 2 are isomorphic
10:    else
11:      T 1 and T 2 are not isomorphic
12: end procedure
```

Figure 7:
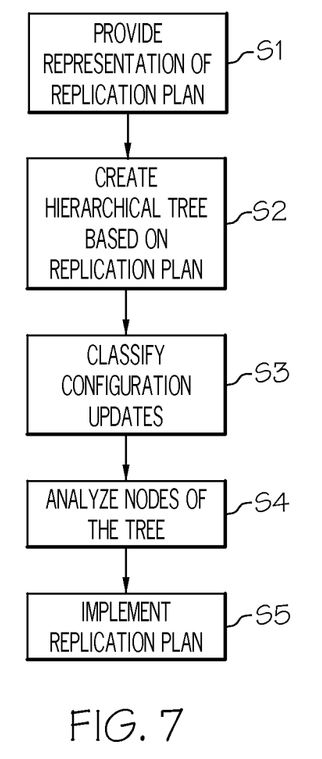
FIG. 7 depicts a method flow diagram according to an embodiment of the present invention.

Referring now to FIG. 7, a method flow diagram according to an embodiment of the present invention is shown. In step S1, a representation of a replication plan is provided in a computer data structure. In step S2, a hierarchical tree data structure having a set of nodes is created based on the representation. In step S3, a set of system configuration updates pertaining to the set of nodes is classified. In step S4, the set of nodes is analyzed to determine if any of the set of nodes is isomorphic. In step S5, the replication plan is implemented responsive to the analyzing.

While shown and described herein as a configuration transition solution, it is understood that the invention further provides various alternative embodiments. For example, in one embodiment, the invention provides a computer-readable/useable medium that includes computer program code to enable a computer infrastructure to provide configuration transition functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide configuration transition functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for configuration transition. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for transitioning replication configurations in a networked computing environment, comprising:
   providing a representation of a replication plan in a computer data structure;
   creating a hierarchical tree data structure having a set of nodes based on the representation;
   classifying a set of system configuration updates pertaining to the set of nodes;
   analyzing the set of nodes to determine if any of the set of nodes is isomorphic; and
   implementing the replication plan responsive to the analyzing;
   wherein the set of nodes comprises: a root node corresponding to an application, and a set of child nodes corresponding to a set of storage volumes.

2. The computer-implemented method of claim 1, the representation being a common integration model (CIM)-compatible representation.

3. The computer-implemented method of claim 1, the set of configuration updates being classified based upon a type of update.

4. The computer-implemented method of claim 3, the type of update being selected from a group consisting of: new resources, new replication licenses, application configuration changes, and migration of application resources.

5. The computer-implemented method of claim 1, the analyzing determining whether any of the set of nodes is isomorphic.

6. The computer-implemented method of claim 5, further comprising modifying the replication plan responsive to at least one of the set of nodes being isomorphic.

7. The computer-implemented method of claim 6, the implementing comprising implementing the modified replication plan.

8. A system for transitioning replication configurations in a networked computing environment, comprising:
   a bus;
   a processor coupled to the bus; and
   a memory medium coupled to the bus, the memory medium comprising instructions to:
     provide a representation of a replication plan in a computer data structure;
     create a hierarchical tree data structure having a set of nodes based on the representation;
     classify a set of system configuration updates pertaining to the set of nodes;
     analyze the set of nodes to determine if any of the set of nodes is isomorphic; and
     implement the replication plan responsive to the analyzing;
     wherein the set of nodes comprises: a root node corresponding to an application, and a set of child nodes corresponding to a set of storage volumes.

9. The system of claim 8, the representation being a common integration model (CIM)-compatible representation.

10. The system of claim 8, the set of configuration updates being classified based upon a type of update.

11. The system of claim 10, the type of update being selected from a group consisting of: new resources, new replication licenses, application configuration changes, and migration of application resources.

12. The system of claim 8, the memory medium further comprising instructions to determine whether any of the set of nodes is isomorphic.

13. The system of claim 12, the memory medium further comprising instructions to modify the replication plan responsive to at least one of the set of nodes being isomorphic.

14. The system of claim 13, the memory medium further comprising instructions to implement the modified replication plan.

15. A computer program product for transitioning replication configurations in a networked computing environment, the computer program product comprising a computer readable storage media, and program instructions stored on the computer readable storage media, to:
   provide a representation of a replication plan in a computer data structure;
   create a hierarchical tree data structure having a set of nodes based on the representation;
   classify a set of system configuration updates pertaining to the set of nodes;
   analyze the set of nodes to determine if any of the set of nodes is isomorphic; and
   implement the replication plan responsive to the analyzing;
   wherein the set of nodes comprises: a root node corresponding to an application, and a set of child nodes corresponding to a set of storage volumes.

16. The computer program product of claim 15, the representation being a common integration model (CIM)-compatible representation.

17. The computer program product of claim 15, the set of configuration updates being classified based upon a type of update.

18. The computer program product of claim 17, the type of update being selected from a group consisting of: new resources, new replication licenses, application configuration changes, and migration of application resources.

19. The computer program product of claim 15, the computer readable storage media further comprising instructions to analyze determining whether any of the set of nodes is isomorphic.

20. The computer program product of claim 19, the computer readable storage media further comprising instructions to modify the replication plan responsive to at least one of the set of nodes being isomorphic.

21. The computer program product of claim 20, the computer readable storage media further comprising instructions to implement the modified replication plan.

22. A method for transitioning replication configurations in a networked computing environment, comprising:
providing a computer infrastructure being operable to:
  provide a representation of a replication plan in a computer data structure;
  create a hierarchical tree data structure having a set of nodes based on the representation;
  classify a set of system configuration updates pertaining to the set of nodes;
  analyze the set of nodes to determine if any of the set of nodes is isomorphic; and
  implement the replication plan responsive to the analyzing;
  wherein the set of nodes comprises: a root node corresponding to an application, and a set of child nodes corresponding to a set of storage volumes.

23. The computer-implemented method of claim 1, wherein the root node is a parent in relation to the set of child nodes.

24. The system of claim 8, wherein the root node is a parent in relation to the set of child nodes.

25. The computer program product of claim 15, wherein the root node is a parent in relation to the set of child nodes.

* * * * *